United States Patent Office 3,720,648
Patented Mar. 13, 1973

3,720,648
WATER DILUTABLE COATING COMPOSITIONS CONTAINING PRECONDENSATES OF PHENOL RESOLS AND ETHERIFIED PHENOL RESOLS
Rolf Güldenpfennig, Bammental, Germany, assignor to Reichhold-Albert-Chemie Aktiengesellschaft, Hamburg, Germany
No Drawing. Continuation-in-part of application Ser. No. 72,200, Sept. 14, 1970, which is a continuation of application Ser. No. 666,453, Sept. 8, 1967, both now abandoned. This application Jan. 14, 1972, Ser. No. 217,969
Int. Cl. C08g 45/08
U.S. Cl. 260—19 EP                             6 Claims

ABSTRACT OF THE DISCLOSURE

Water-dilutable heat-curable coating compositions for electrophoretic deposition comprising the following components:
(I) precondensates of hydrophilic plasticizing epoxy resin partial esters with thermosetting aldehyde products formed by heating to temperatures of about 80 to 160° C. in the proportions of about 1 to 50 percent by weight of said thermosetting aldehyde products to said partial esters, said precondensates having a Gardner-Holdt viscosity of about B to Q measured at 50 percent in butyl glycol and an acid number range of 60 to 100, wherein:
(a) said hydrophilic plasticizing epoxy resin partial esters are selected from the group consisting of:
(1) the partial esters of compounds containing epoxy groups or hydroxyl groups produced by hydrolytic cleavage of said epoxy groups with at least one monocarboxylic acid and a polybasic carboxylic acid;
(2) the partial esters of compounds containing epoxy groups or hydroxyl groups produced by hydrolytic cleavage of said epoxy groups with a polybasic carboxylic acid; and
(3) mixtures of (1) and (2); wherein said polybasic carboxylic acid of (1) and (2) comprises hydrolyzed adducts selected from the group consisting of maleic acid with fatty acids and maleic anhydride with fatty acids, said fatty acids are selected from the group consisting of drying oil acids and semi-drying oil acids, the molar proportions of fatty acid to maleic acid or maleic anhydride is between about 0.9:1 and 1.1:1 and the molar proportion of free hydroxyl groups to free carboxyl groups is between about 1:0.8 and 1:1, wherein one epoxy group is calculated as two hydroxyl groups and one anhydride group is calculated as two carboxyl groups, said adducts containing no more than 3 percent free maleic anhydride; and
(b) said thermosetting aldehyde products are selected from the group consisting of
(1) phenol resols;
(2) etherified phenol resols;
(II) strong nitrogenous bases forming soaps with the said hydrophilic plasticizing epoxy resin partial esters; and
(III) water.

CROSS REFERENCES TO RELATED APPLICATIONS

Applicant claims priority under 35 U.S.C. 119 for application Ser. Nos. R 44,089 IVc/22g and R 44,094 IVc/22g filed in the Patent Office of the Federal Republic of Germany on Sept. 9, 1966, having now Ser. Nos. P 16 69 280.1 and P 16 69 282.3.

Applicant incorporates by reference U.S. Pat. 3,481,-890, filed May 27, 1965, entitled "Water-Dilutable Heat-Curable Lacquer Compositions"; and his copending application Ser. No. 132,175, filed Apr. 7, 1971, which is a continuation application of U.S. application Ser. No. 532,866, filed Mar. 7, 1966, and entitled "Water-Dilutable Compositions and Lacquer Binders," both now abandoned.

BACKGROUND OF THE INVENTION

(1) Field of the invention

This is a continuation-in-part of application Ser. No. 72,200, filed Sept. 14, 1970, which is a streamlined continuation of application Ser. No. 666,453, filed Sept. 8, 1967, both now abandoned.

The field of the invention is coating compositions containing fat, fatty oil, fatty oil acid or salts thereof.

This invention relates to coating compositions of the kind described in application Ser. No. 132,175 and in Pat. 3,481,890, which consist of at least one and possibly several plasticized hydrophilic synthetic resins containing free carboxyl and hydroxyl groups, ammonia and/or a strong organic nitrogen base and water. The resins are prepared either by esterifying epoxy groups containing compounds or such polyhydroxyl compounds which are derived by hydrolytic cleavage directly from the epoxy groups containing compounds, with monobasic or polybasic carboxylic acids, or by esterifying epoxy groups containing compounds or such polyhydroxyl compounds as are derived by hydrolytic cleavage directly from the epoxy groups containing compounds, with polybasic carboxylic acids. The coating compositions also contain thermosetting, water soluble or at least hydrophilic low molecular weight aldehyde condensation products prepared in a known manner from phenols and/or phenolcarboxylic acids and formaldehyde.

(2) Prior art

The U.S. Pat. 3,355,401 (Tanner) claims a water-thinnable coating composition comprising a condensation polymer of a glycidyl polyether with a combination of at least two acidic materials consisting of at least one monobasic fatty acid and at least one dimerised fatty acid, which condensation polymer is neutralised and diluted with water.

The disclosure of Tanner teaches only the esterification of glycidyl polyethers using mono- and/or polybasic organic acids. By Example 5 the use of a butylated melamine-formaldehyde resin and of an alkyd resin is described as a mere admixture to the resin of Example 1 (column 6, lines 21 to 26). Differing from the present invention Tanner does not suggest the use of phenol resols nor does he carry out any precondensation step between the melamine-formaldehyde resin of Example 5 and his esterification product. In the aqueous solution of Tanner any such condensation step could not possibly take place at the moment of admixture.

The U.S. Pat. 3,305,501 (Spalding) claims a water-soluble reaction product of a polycarboxylic acid and a glycidyl polyether of a dihydric phenol or aliphatic polyol, which reaction product is rendered water-soluble by adding sufficient amino compound.

In column 7, lines 12 to 22, Spalding proposes to add water soluble aminoplasts to the resin solution as crosslinking agent during the curing process of the coatings at 350° F. Although, in lines 19 to 23, he discloses that these aminoplasts "can be readily reacted" with hydroxyl groups of the epoxy compound, he does not give any instructions for carrying out a precondensation step before preparation of the films. In column 6, lines 4 to 6, the aqueous epoxy ester solution "is blended" with a methylated methylol melamine resin, which means simply admixed without any reaction possibly taking place in this aqueous solution before baking. In the present invention the step of precondensation has proved necessary for the electrophoretic coating procedure. The resins of Spalding are therefore not suited for electrophoretical coating, since also the superior combination of phenol resols and epoxy resins partial esters is not disclosed by the patent of Spalding.

The U.S. Pat. 3,308,077 (Pattison) claims an aqueous coating composition containing a resinous ester obtained by partial esterification of a polyol having at least 3 hydroxyl groups with a drying oil fatty acid and further esterifying at least part of the remaining unesterified hydroxyl groups with maleinized fatty acid.

In column 3, lines 20 to 22, Pattison disclosed that "the coating composition may also be employed as baking enamels by incorporating therewith thermosetting aminoplast resins and, if necessary, acid catalysts."

By Pattison no explanation is given, what is meant by "incorporating" and also no precondensing instructions are disclosed, see column 4, lines 56 to 59, where only an aqueous dispersion of the components is being described. Also Pattison does not suggest the use of his resins for the electrophoretic deposition (column 3, lines 57 to 59), during which acid catalysths would disturb the coating process.

Neither of the references, alone or in combination, show the precondensation of epoxy resin partial esters and phenol aldehyde condensation products as defined in the present invention.

The U.S. Pat. 2,649,433 (Hoenel) describes the production of a hardenable resin by combining a low molecular resol and a neutral plasticizing aldehyde resin having an excess of free alcoholic hydroxyl groups over the carboxylic groups of the ester forming components.

By this U.S. patent no water-dilutable coating compositions are described being produced from epoxy resins and phenol resols.

The U.S. Pat. 2,681,894 (Hoenel) describes a composition of matter being water soluble and comprising the combination product of low molecular methylol compounds and plasticizing alkyd resin having an excess of hydroxyl groups over carboxyl groups, which product is rendered water soluble by adding a strong organic base or ammonia.

In column 5, lines 31 to 44, Hoenel suggests the reacting of the formaldehyde condensates with the carboxylic and hydroxyl groups bearing resin "at least to a limited extent," but Hoenel, however, has not given any examples for the precondensation so that his findings are purely theoretical. Hoenel, however, discloses that on account of the increase of the molecular state "a quicker set of the aqueous varnish is achieved thereby." This use of the words "quicker set" leads to the expectation that the precondensate suggested by Hoenel was not very stable in aqueous solution.

Also Hoenel requires, in column 3, lines 29-39, that the alkyd resin must depend on free hydroxyl groups, not only for water-solubility but also for compatibility with phenol resols. Hoenel thereby expressly excludes the epoxy resin esters of this application which depend almost entirely on free secondary hydroxyl groups. Moreover, Hoenel does not mention epoxy resin esters.

In column 1, lines 16 to 20, Hoenel teaches the equivalence of water soluble resols and aminoplasts.

The present invention shows by comparison tests 1 to 5 that phenol resols have proved superior when precondensed with epoxy resins, in that an improved storage stability of the aqueous solutions of the resin and also a much better corrosion resistance of the finished coatings were achieved.

These new unexpected results of the present invention are not to be anticipated from the teachings of the prior art..

The longer storage stability could not be anticipated since a molecular increase occurs with precondensation and from the teachings of Hoenel it should be anticipated that the storage stability would be reduced.

Until now the automobile industry experienced great difficulty with respect to the storage stability of the aqueous solutions using water-soluble coating agents. The car bodies were either applied in mechanical dipping methods with a primer or the coating was carried out by the electrophoretic method. The instability of the compositions of the prior art has been solved in the surprising manner by the present invention since the present coating agents are characterized by particularly good storage stability and excellent corrosion resistance.

The U.S. Pat. 3,242,119 (Ott) claims a water soluble synthetic resin composition which comprises a reaction product of an etherified melamine formaldehyde condensate, a plastifying alkyd resin and a strong nitrogen base. The disclosure does not contain any hint that epoxy resins and/or phenol resols can be employed with equal success concerning the properties of the obtained resin.

The U.S. Pat. 2,915,486 (Shelley) claims a composition comprising an aqueous dispersion of a salt of a condensation product of a butylated polymethylol melamine with a polyester.

Shelley does not suggest the use of resols nor does he employ epoxy resins.

The resins obtained according to Shelley can therefore not be compared with resins of the present invention in view of corrosion resistance of the finished coatings.

Also the Belgian Pat. 633,074 discloses on page 2, lines 9 to 10 from the bottom of the page, that coatings being processed from aqueous dispersions such as those of Shelley, are porous and permeable to steam.

The coated surface is not duly protected against corrosion if the coating is not homogeneous.

The U.S. Pat. 3,133,032 (Jen) claims a water-dispersion useful as a coating composition, consisting of an amine-aldehyde resin and an alkyd resin having a molecular weight in the range of 1500 to 20,000.

The coating composition of Jen is produced by simply admixing aqueous solutions of the amine-aldehyde resin and the alkyd resin. In this watery dispersion no precondensation of the two components can take place (see column 1, lines 48 to 50). Also no epoxy resin is employed by Jen.

The present invention differs from the prior art in that as a result of the precondensation, the compositions have much greater utility in electrophoretic depositions. This precondensation produces a better migration of the resins in a constant ratio and this results in improved storage stability over a period of time. In the non-precondensed mixtures of the prior art, electrophoretic baths made therefrom become enriched in one component or another and after a period of electrophoretic deposition the bath is no longer useable.

The Belgian Pat. 633,074 claims a method for producing water-soluble coating compositions for electrophoretic deposition, comprising neutralizing a synthetic resin being produced from an alkyd resin and containing an aminoplast or phenoplast resin as modifier.

The Belgian patent discloses on page 7 that mechanical mixtures of alkyd resins or maleinized oils with phenol or aminoplasts are excellently suited for electrophoretic deposition. These conclusions are, however, not confirmed by experience which has been gained in practice when such electrophoretic baths are used. The resin suggested by the Belgian patent very quickly show a deficient storage stability and also a variation in the composition of the electrophoretically deposited coatings. These facts are confirmed by the statements in U.S. Pat. 3,444,114 of Downing, at column 1, lines 33–50.

The U.S. Pat. 3,196,117 (Boller) discloses a combination of alkyd resins which form complexes with epoxidized fatty acids or oils, and mentions that phenol formaldehyde resins can be mixed therewith. These complexes do not consist of esterification products between compounds containing epoxide groups and carboxylic acids as disclosed in the present invention. Further, Boller nowhere shows the precondensation of the epoxy resin partial esters with an aldehyde condensation product.

The further state of the art is presented by U.S. Pat. 3,444,114, claiming aqueous compositions consisting of alkyd resin and alkylated amino resin combinations; U.S. Pat. 3,409,581, disclosing polyhydroxyether modified resol phenolic resins not water-soluble; U.S. Pat. 3,450,660, claiming water-dispersible heat-hardenable interpolymers of alkoxy alkylated aminotriazine with unsaturated acid; U.S. Pat. 3,502,557 stating electro deposition of amine aldehyde condensation products and a non-resinous polyfunctional hydroxyl-containing carboxylic acid; U.S. Pat. 3,549,577 claiming a process for the manufacture of a water-soluble reaction product of a polyester prepolymer and an alkylated polymethylol melamine.

U.S. Pat. 3,563,926 claims a process for producing water-soluble synthetic resins having a substantially different structure from those resins claimed in the present invention in that the phenolic compounds are not condensed to the epoxy compounds over the methylol groups of the resols but over the phenolic hydroxyl groups.

U.S. Pat. 3,567,668 claims a method for preparing epoxy resin esters precondensed with phenoplastic or aminoplastic resins, which method is carried out in a different succession of reaction steps from the reaction by which the resins of the present invention are produced. Also the advantage of phenol resols over aminoplasts is not disclosed in Pat. 3,567,668.

SUMMARY OF THE INVENTION

Having particularly in mind the coating compositions pertaining to phenol resols, it is an object of the present invention to add thereto precondensates of phenol resols and epoxy resins.

Water-dilutable heat-curable coating compositions for electrophoretic deposition comprising the following components:

(I) precondensates of hydrophilic plasticizing epoxy resin partial esters with thermosetting aldehyde products formed by heating to temperatures of about 80 to 160° C. in the proportions of about 1 to 50 percent by weight of said thermosetting aldehyde products to said partial esters, said precondensates having a Gardner-Holdt viscosity of about B to Q measured at 50 percent in butyl glycol and an acid number range of 60 to 100, wherein:
  (a) said hydrophilic plasticizing epoxy resin partial esters are selected from the group consisting of:
    (1) the partial esters of compounds containing epoxy groups or hydroxyl groups produced by hydrolytic cleavage of said epoxy groups with at least one monocarboxylic acid and a polybasic acid carboxylic acid;
    (2) the partial esters of compounds containing epoxy groups or hydroxyl groups produced by hydrolytic cleavage of said epoxy groups with a polybasic carboxylic acid; and
    (3) mixtures of (1) and (2); wherein said polybasic carboxylic acid of (1) and (2) comprises hydrolyzed adducts selected from the group consisting of maleic acid with fatty acids and maleic anhydride with fatty acids, said fatty acids are selected from the group consisting of drying oil acids and semidrying oil acids, the molar proportion of fatty acid to maleic acid or maleic anhydride is between about 0.9:1 and 1.1:1 and the molar proportion of free hydroxyl groups to free carboxyl groups is between about 1:0.8 and 1:1, wherein one epoxy group is calculated as two hydroxyl groups and one anhydride group is calculated as two carboxyl groups, said adducts containing no more than 3 percent free maleic anhydride; and
  (b) said thermosetting aldehyde products are selected from the group consisting of:
    (1) phenol resols;
    (2) etherified phenol resols;
(II) strong nitrogenous bases forming soaps with the said hydrophilic plasticizing epoxy resin partial esters; and
(III) water.

Another object of the present invention is to add precondensates of etherified phenol resols and epoxy resin partial esters to coating compositions containing phenol resols.

Still another object of the present invention is to replace the phenol resols with precondensates of phenol resols and epoxy resin partial esters, in the compositions as disclosed in application Ser. No. 132,175.

It is still another object of the present invention to replace the phenol resols of the compositions disclosed in application Ser. No. 132,175 with precondensates of etherified phenol resols and epoxy resin partial esters.

Upon further study of the specification and claims, other objects and advantages of the present invention will become apparent.

In a further development of the prior coating compositions disclosed in application Ser. No. 132,175, it has been found that they are improved by being made to contain, in addition to or instead of the phenol resols, precondensates of phenol resols and epoxy resin partial esters. Also the phenol carboxylic acid resols are among the suitable phenol resols. The precondensation is effected according to the usual methods by heating to temperatures of about 80 to 160° C. Precondensation in vacuum is especially advantageous as the excess of reaction water is then quickly eliminated. The proportions in the precondensation of the epoxy resin partial ester to the thermosetting condensation products, especially of phenol resols, are between 1 and 50% by weight, preferably between 5 and 35% by weight. The degree of precondensation is estimated by the rise of the viscosity. For electrophoretic resins the viscosity, measured with 50% in butyl glycol, lies within the range B–Q (Gardner-Holdt viscosimeter). The best results are obtained when the viscosity falls within the range C–K (0.85–2.75 stokes/25° C.). The preferred acid number range for precondensed resins lies at about 60–100. The degree of precondensation and the proportion of precondensed phenol resols in the coating masses is adjusted in such a manner according to this invention that after stoving, homogeneous films with the desired advantageous qualities are obtained.

In addition to or instead of the phenol resols described in application Ser. No. 132,175 these coating compositions can also contain phenol resols that have been etherified with low molecular weight aliphatic alcohols having one to four carbon atoms, especially alkyl phenol resols.

These coating compositions are also improved if in addition to or instead of the etherified phenol resols, they also contain precondensates of etherified phenol resols and epoxy resin partial esters. Among the useable etherified phenol resols there are also the etherified phenol carboxylic acid resols.

Such precondensation is effected by heating to temperatures of about 80 to 160° C. Precondensation in vacuum is especially advantageous because the excess of water is then removed very quickly. The proportions of epoxy resin partial ester to thermosetting condensation product, especially to phenol resol, lies between 1 and 50 percent by weight, the preferred range being about 5 to 35% by weight. The degree of precondensation is estimated by the rise of the viscosity. For electrophoretic resins the viscosity at 50% in butyl glycol is within the range of B–Q (Gardner-Holdt viscosimeter). The best results are obtained if the viscosity falls within the range of C–K (0.85 to 2.75 stokes/25° C.). The preferred acid number range for precondensation resins lies between 60 and 100. The degree of precondensation and the proportion of precondensed phenol resols in these coating compositions is regulated so that after stoving, homogeneous films with the desired properties are obtained.

DESCRIPTION OF THE PREFERRED EMBODIMENTS

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Examples of the phenol resols comtemplated by the present invention are:

Thermosetting, hydrophilic, low molecular condensation products such as phenol alcohols and phenolpolyalcohols that are obtained low molecular by condensation of one or more nuclear phenols with aldehydes such as formaldehyde, acetaldehyde, crotonaldehyde, acroleine, benzaldehyde, furfurol etc., or formaldehyde donating compounds such as paraformaldehyde, paraldehydetrioxymethylene. The preferred aldehyde is formaldehyde. Suitable phenols are those substituted in the ortho or ortho-para-position, which are still condensable (e.g.) phenols such as cresol, xylenol, especially suitable are resols obtained from alkyl phenols such as propyl, butyl, and especially para-tert.butyl-phenol. Furthermore suitable are resols from binuclear phenols such as diphenol, bisphenol A and especially if per mole phenol about 1.75 up to 2.5 moles formaldehyde have been accumulated. When applying the resols, it is recommended to use also a small amount of a strongly hydrophilic solvent, such as ethylglycol, diethyl glycol, propyl glycol, isopropyl glycol, butyl glycol.

Resols of phenol carboxylic acids are preferably used, which are obtained by condensation of formaldehyde or formaldehyde supplying compounds with suitable phenol carboxylic acids. Among the phenol carboxylic acids condensable with formaldehyde the 4,4-bis-(4-hydroxyphenyl)-valeric acid occupies a preferred position. Here too, the most advantageous results are obtained when 1.75 to 2.5 moles formaldehyde are combined per mole of diphenol acid. It is recommended to neutralize the phenol carboxylic acid resols preferably with ammonia before mixing with the plasticizing component I. The production of other suitable phenol carboxylic acid resols is described in the German Pat. 1,113,775.

Examples of precondensates of phenol resols and epoxy resin partial esters contemplated by the present invention are: as the phenol resol component of these precondensates the aforementioned phenol resols can be used and as the epoxy resin partial esters as other component of the precondensates of the phenol resols the following are suitable: partial esters from the following epoxy group containing compounds or hydroxyl group containing compounds produced by hydrolytic cleavage of epoxy groups such as:

Epoxydized olefins, diolefins and oligo-olefins, such as 1,2,5,6-diepoxy hexane and 1,2,4,5-diepoxy hexane epoxidized, olefinically or diolefinically unsaturated carboxylic acid esters with mono- or polyvalent alcohols, such as diepoxy stearic acid ester or monoepoxy stearic esters of the methanol, ethanol, propanol, including its isomers, butanol, including its isomers; bis-(diepoxystearic acid)- and/or bis-(monoepoxy stearic acid)-ester of polyvalent alcohols, such as ethylene glycol, 1,2- or 1,3-propylene glycol, 1,2- 2,3- 1,4-butylene glycol, neopentyl glycol, 1,6-hexandiol, glycerol, trimethylol propane, trimethylol ethane, pentaerythritol; tri-(diepoxy stearic acid)- and/or tri-(mono epoxy stearic acid)- ester of the glycerol, trimethylol propane, trimethylol ethane or pentaerythritol tetra-(diepoxy stearic acid)- and/or tetra-(mono epoxy stearic acid)-ester of the pentaerythritol.

Furthermore, the following come into question: epoxidized unsaturated oils, such as soy bean oil, safflower oil, dehydrated castor oil alone or in mixture, epoxidized compounds with several cyclohexenyl radicals, such as diethylene glycol-bis-(3,4-epoxy-cyclohexane carboxylate) and 3,4-epoxy-cyclohexyl methyl-3,4-epoxy-cyclohexane carboxylate and vinyl-cyclohexane-dioxide.

Especially suitable are polyesters with epoxy groups as are accessible by reacting a dicarboxylic acid with epihalogenhydrin or dihalogenhydrin, such as epichlorohydrin, dichlorohydrin or the like in the presence of alkali. Such polyesters may derive from aliphatic dicarboxylic acids, such as oxalic acid, amber acid, glutaric acid, adipic acid, pimelic acid, suberic acid, azelaic acid, sebacic acid or from aromatic dicarboxylic acids, such as phthalic acid, isophthalic acid, terephthalic acid, 2,6-naphthylenedicarboxylic acid, diphenyl-o,o'-dicarboxylic acid and ethylene glycol-bis-(p-carboxyl phenyl)-ether, which are supplied alone or in mixture. They correspond essentially to the formula:

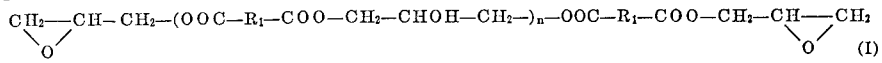

(I)

$R_1$ representing an aliphatic or aromatic carbon radical and $n=0$ or a small number. The compounds of the formula mentioned, whose molecular weights do not surpass 3000, are well suited. Those having molecular weights of between 500 and 1000 are preferred.

Polyethers with epoxy groups are best suited such as those obtained by etherification of a bivalent alcohol or diphenol with epihalogen hydrine or dihalogen hydrines, e.g. with epichlorohydrin or dichlorohydrin in the presence of alkali. These compounds may derive from glycols, such as ethylene glycol, diethylene glycol, triethylene glycol, propylene glycol-1,2, propylene glycol-1,3, butylene glycol-1,4, pentanediol-1,5, hexanediol-1,6, and especially from diphenols such as resorcinol, pyrocatechol, hydroquinone, 1,4-dihydroxy naphthalene, bis-(4-hydroxy phenyl)-methane, bis-(4-hydroxy phenyl)-methyl phenyl methane, bis-(4-hydroxy phenyl)-tolyl methane, 4,4'-dihydroxy diphenyl and 2,2-bis(4-hydroxy phenyl)-propane.

The polyethers containing epoxy groups have the following general formula:

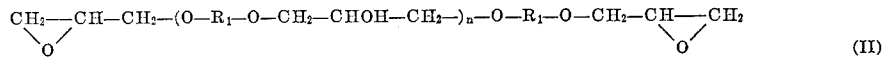

(II)

$R_1$ representing an aliphatic or aromatic carbon radical and $n=0$ or a small number.

Epoxy group containing polyethers of the general formula are to be emphasized especially:

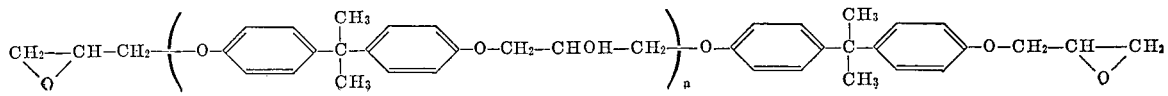

which contain 2,2-bis-(4-hydroxy phenyl)-propane as initial compound; of which preferably such polyethers with a molecular weight of between approximately 380 and approximately 3500 are employed.

For electrophoretically depositable coating compounds, those polyethers with a molecular weight of 380 to approximately 900 are preferably suitable. Those with a higher molecular weight are also suitable, they too provide highly corrosion resistant films, but it is more difficult to obtain layers of greater thickness. For water-dilutable coating compositions which are applied by customary means, such as dipping, spraying, flooding, pouring, spreading, polyethers with a higher molecular weight are preferred.

Furthermore, those polyglycidyl ethers derived from tri- and polyhydroxyl compounds may also be used, by which ethers with two and more glycidyl radicals should be understood. Such may be trimethylol propane triglycidyl ether, trimethylol ethane triglycidyl ether, glycerol triglycidyl ether, pentaerythritoltriglycidyl ether, pentaerythritoltetraglycidyl ether, pentaerythritoltetraglycidyl ether or polyglycidyl ether of esters of polyvalent alcohols with hydroxy acids, such as di- or triglycidyl ether of the triricinoleates or of the castor oil respectively.

Among the polyglycidyl ethers, those which are obtained in a known manner (German Pats. 1,184,496 and 1,138,542) by reaction of novolacs on the basis of phenol, cresol, xylenol, or bisphenols with epichlorohydrin are well suited. Other epoxides and/or epoxy resins with epoxy groups or epoxy groups and hydroxyl groups and with a molecular weight of up to approximately 3000 have been described in a large number in the book "Epoxyverbindungen und Epoxyharze" by A. M. Paquin, Springer-Verlag, 1958, Berlin, Göttingen, Heidelberg.

The epoxy resin partial esters are formed by reacting the epoxy group compounds with the following carboxylic acids:

Straight and/or ramified chained, saturated and/or unsaturated fatty acids having 1 to 40 carbon atoms, such as acetic acid, propionic acid, butyric acid, valeric acid, capronic acid, caprylic acid, iso-octanic acid, nonanic acid, isononanic acid, undecanic acid, lauric acid, myristic acid, palmitic acid, palmitoleic acid, petroselinic acid, stearic acid, oleic acid, eleaidic acid, 9,12-linoleic acid, 9,11-linoleic acid, (in the cis, cis-trans and trans-trans form), linoleic acid, elaeostearic acid, arachic acid, behenic acid, lignocerinic acid, eruca acid, arachidonic acid, clupanodonic acid, α-parinaric acid, α-licanic acid, or their anhydrides respectively, alone or in mixture. Preferred carboxylic acids are fatty acid mixtures such as obtained from natural vegetable fats and animal fats, such as cotton seed oil, soy bean oil, peanut oil, wood oil, maize oil, oiticica oil, olive oil, poppy seed oil, perilla oil, colza oil, coco-nut oil, linseed oil, sunflower oil, safflower oil, walnut oil, grapeseed oil, sardine oil, herring oil, menhaden oil, trane oil, lard, beef suet, especially linseed oil, soy bean oil, coconut oil, and safflower oil. Furthermore, technical fatty acids may be used, especially tall oil fatty acids, chemically treated fatty acids or fatty acids from chemically treated fats, especially dehydrated castor oil fatty acids, or fatty acids conjugated by catalytic processes. Fatty acids from catalytically conjugated fats, especially conjugated linseed oil, soy bean oil, safflower oil fatty acids, fatty acids elaidinated by catalytic processes or fatty acids from elaidinated fats, hydrated or partially hydrated fatty acids or fatty acids from hydrated and/or partially hydrated fats, e.g. fish oils, as well as rosin acids, especially colophonium and/or hydrated and/or partially hydrated rosin acids, especially hydrated and/or partially hydrated colophonium or mixtures of such acids or acid mixtures of the above-named type with each other.

By monobasic carboxylic acids there are included partial esters of polybasic carboxylic acids which contain one free carboxyl group only, such as mono esters of amber acid, glutaric acid, adipic acid, pimelic acid, suberic acid, azelaic acid, sebacic acid, especially partial esters of dimerized or oligomerized unsaturated fatty acids and/or partial esters of such "tricarboxylic acids" not exactly definable, which result from adduct formation of α,β-unsaturated dicarboxylic acids or their anhydrides respectively, to unsaturated fatty acids, as described in greater detail below, with preferably straight chained saturated aliphatic alcohols with 1 to 20 carbon atoms, such as methanol, ethanol, propanol, butanol, pentanol, hexanol and the like, whereby methanol is preferred.

Bakeable coating compounds with excellent properties are obtained when phenol carboxylic acids condensable with formaldehyde are used alone or in mixture with the previously named monobasic carboxylic acids. Among these, 4.4-bis-(4-hydroxy-phenyl)-valeric acid has a special significance.

Furthermore, it has been found that instead of monobasic carboxylic acids, which are bonded to the epoxy resin by esterification, compounds containing monohydroxyl groups can be inserted by etherification, in the proportion in which epoxy groups are contained in the epoxy resin, i.e. one hydroxy group can be bonded per epoxy group. As compounds containing hydroxyl groups, rosin alcohols and especially higher fatty alcohols are suitable, such as lauryl alcohol, myristyl alcohol, palmityl alcohol, stearyl alcohol, but also esters of hydroxy fatty acids, such as ricinoleic acid ester, hydroxy stearic acid ester.

As polybasic carboxylic acids, the following are suitable alone or in a mixture, di-, tri- and polycarboxylic esters, e.g. oxalic acid, amber acids, glutaric acids, adipic acid, pimelic acid, suberic acid, azelaic acid, sebacic acid, maleic acid, fumaric acid, citraconic acid, mesaconic acid, itaconic acid, phthalic acid, isophthalic acid, terephthalic acid, tetra- and hexahydrophthalic acid, trimellitic acid, pyromellitic acid, or their anhydrides.

Among the dicarboxylic acids, the polybasic acids obtained by dimerization or oligomerization of unsaturated fatty acids should be emphasized. Preferably converted are the "tricarboxylic acids" form by addition of α,β-unsaturated dicarboxylic acids or their anhydrides respectively, as far as they exist, such as maleic acid, fumaric acid, mesaconic acid, citraconic acid, itaconic acid or their anhydrides respectively, among which maleic anhydride is preferred, to unsaturated fatty acids, such as palmitoleic acid, petroselinic acid, oleic acid, elaidic acid, cis-cis, cis-trans, trans-trans-9,12-linoleic acid, cis-cis, cis-trans, trans-trans-9,11-linoleic acid, linoleic acid, eruca acid, clupanodonic acid, licanic acid, parinaric acid alone or in mixture. Especially suitable are fatty acid mixtures are used or unsaturated fatty acids, as are obtained from natural vegetable and animal unsaturated fats by a saponification, such as fatty acids from cotton seed oil, lupine oil, maize oil, colza oil, sesame oil, grapeseed oil, walnut oil, perilla oil, linseed oil, wood oil, oiticica oil, especially soy bean oil, poppy seed oil, sunflower oil, safflower oil; eminently suitable are furthermore unsaturated technical fatty acids, especially tall oil fatty acid. In the range of chemically treated oils, especially fatty acids of dehydrated castor oil are suited, whereas it is possible to employ conjugated and/or elaidinated fatty acids or fatty acids of catalytically conjugated and/or elaidinated fats, e.g. isomerized soy bean oil, safflower, and linseed oil fatty acids, but they are not preferred in practice. Furthermore, rosin acids, such as colophonium or partially hydrated rosin acids are suitable as unsaturated acids, as a rule, however, only as additives to the fatty acids named of up to approximately 50 weight percent. The fatty acids mentioned may be used alone or mixed with each other.

The adduct formation is effected according to the known methods by heating, the Diels-Alder reaction and the so-called "substituting addition" (H. Wagner, H. F. Sarx "Lackkunstharze," 1959, Karl Hanser Verlag, page 87) being the main reaction. The mole proportion of α,β-unsaturated carboxylic acids to unsaturated fatty acids may vary and naturally also depends on the type of fatty acids used; the adducts most preferred, however, are those with a proportion between 0.9:1 and 1.1:1.

Adduct formation may also be effected with the oils, i.e. triglycerides. The saponification then takes place subsequently. It is also possible to catalyze the isomerization of the fatty acids during the formation of adducts.

By adding antioxidant agents, the risk of polymerization during the formation of adducts can be reduced. Relatively low viscosity oils are obtained. Additives, such as triphenyl phosphite, which affect the color favorably, permit to obtain clear adducts even when using raw materials of lower quality.

When anhydrides of α,β-unsaturated dicarboxylic acids are used for adduct formation, it is frequently suitable to hydrolyze these before reaction with the epoxy resin. It is then easier to control the course of the esterification reaction. As a rule, this measure is only required when a larger number of epoxy groups is still present at the moment of adding the "tricarboxylic acid."

Furthermore the polybasic carboxylic acids should also be understood to include partial esters of polycarboxylic acids, which however, must still meet the condition to be polybasic carboxylic acids. Especially partial esters of polybasic carboxylic acids with saturated, straight chained aliphatic monoalcohols with 1 to 20 carbon atoms come into consideration. Among these, the partial esters of the above described "tricarboxylic acids" are especially suitable, which have been obtained by adduct formation of α,β-unsaturated dicarboxylic acid or their anhydrides to unsaturated fatty acids. Such partial esters may be obtained either:

(a) By reacting α,β-unsaturated dicarboxylic acids or their anhydrides with esters mentioned in the foregoing unsaturated fatty acids with preferably saturated, straight chained aliphatic monoalcohols with 1 to 20 carbon atoms, such as methanol, ethanol, propanol, butanol, pentanol, hexanol and the like, especially methanol, or (b) By partially esterifying the adduct formed with preferably saturated, straight chained, aliphatic monoalcohols with 1 to 20 carbon atoms, such as methanol, ethanol, propanol, butanol, pentanol, hexanol and the like, especially methanol.

The polybasic carboxylic acids obtained according to the methods described under (a) and (b) are not identical. The water-dilutable coating compositions produced using them show a different behaviour, for example with reference to storability. Their behaviour in the method according to the invention also differs, the polybasic carboxylic acids produced according to the method described under (b) require a somewhat higher esterifying temperature. The polybasic carboxylic acids obtained according to the method described under (b) are preferred.

The production of the partial esters of epoxy groups, possibly compounds containing hydroxyl groups or such polyhydroxyl compounds as have been obtained by hydrolytic cleavage of epoxy groups, is effected with monobasic carboxylic acid by heating and can be accelerated in the case that reaction water is formed by adding azeotropic agents removing the reaction water, i.e. xylol, or by working at reduced pressure. It is recommended to remove the dragging agent before the subsequent esterification with polybasic carboxylic acids. The esterification is preferably effected until the acid number of the partial ester amounts to about zero.

Esterification is simplified by adding basic catalyzers which accelerate the cleavage of the epoxy groups, such as anhydrous sodium carbonate. Resins of a lower viscosity are thus obtained simultaneously.

When esterifying polybasic carboxylic acids using epoxy resin partial esters or compounds containing epoxy groups, it should be observed that when applying mixtures of polybasis carboxylic acids with carboxyl groups of different reactivity as a rule the partial esterification should not take place simultaneously but subsequently, and in such a way that the acids with less active carboxyl groups are partially esterified at first, usually at a higher temperature, and those with more active carboxyl groups subsequently, usually at lower temperatures. It should be acted correspondingly when anhydrides of polybasic carboxylic acids are brought to reaction.

The precondensates of the aforementioned phenol resols and of the hydroxy respectively epoxy partial esters must have the following properties to be serviceable for the present invention:

(1) Viscosity between B and Q according to Gardner-Holdt measured 50% in n-butyl glycol.

(2) Acid number between 60 and 100; and the stoved films have to be homogeneous.

Etherified phenol resols as components for the precondensates from etherified phenol resols and epoxy partial esters contemplated by the present invention are: the above-mentioned phenol resols respectively alkyl phenol resols, however, they have to be etherified with low monovalent aliphatic alcohols such as methanol, ethanol, n-propanol, isopropanol, n-butanol, isobutanol. As epoxy resin partial esters the aforementioned partial esters are suitable.

These precondensates have to have the following properties: viscosity between B–Q according to Gardner-Holdt 50% in glycol. The acid number should be between 60 to 100 and the stoved films have to be homogeneous.

Production of preliminary product (a)

45 parts dehydrated castor oil fatty acid,
30 parts tall oil fatty acid, and
25 parts maleic anhydride are brought to reaction in the known manner in a flask with agitator and cooler under inert gas at 180 to 220° C. until no more than 3% by weight of the amount of maleic anhydride used are free. Hydrolyzation is then effected by adding 5 parts water and by maintaining the product at 100° C. for two hours.

Production of phenol resol 1

60 parts of p-tert.-butyl phenol and
80 parts aqueous formaldehyde solution (30%)

are reacted together under the action of strong lyes at about 40° C. in the known manner, until the contents of free formaldehyde has decreased to about 0. With strong acids, the resol is broken up and washed with water to be salt-free.

Preparation of the epoxy resin partial ester 640 parts of an epoxy resin which was obtained in the usual manner from bisphenol A and epichlorohydrin in the presence of an alkali and having an epoxy equivalent weight of 230 to 280, a melting point of about 20–28° C. and molecular weight of about 470, are reacted at 100–130° C. with 705 parts of the preliminary product (a) until the viscosity (of 50% in butyl glycol) amounts to about G (Gardner-Holdt viscosimeter). The acid number was found to be 135.

Preparation of the phenol resol A 500 parts p-tert.-butyl phenol resol 1 are reacted with such quantities of methanol that the water content of the reaction mixture, referred to methanol, amounts to not more than 20% by weight. Then sulfuric acid is added until a pH value of about 2 to 1 is reached, and the mixture is then heated about 2 to 3 hours at 60° C. The solids content of a neutralized sample increases by about 2 to 3% by weight. The product is then neutralized with soda lye and the methanol and water are distilled off under vacuum, during which time a temperature of 60° C. should not be exceeded. The reaction mixture is washed twice with distilled water in order to eliminate the salts.

By adding water the solids content is adjusted to 60% by weight.

EXAMPLE 1

600 parts of the epoxy resin partial ester are mixed with 545 parts phenol resol 1. This mixture is maintained at a temperature of 90–100° C. until the viscosity of the mass, measured at 50% in butyl glycol has reached about G (Gardner-Holdt viscosimeter). The acid number of the product amounts to about 80. The resin is diluted with butyl glycol to a solids content of about 80% by weight and is neutralized with diisopropanol-amine in the presence of water to a pH value of about 7.8–8.2. The condensation is effected under vacuum whereby the excess water is distilled off. The resin is diluted to about 75 weight percent solids content with glycol ethers of which methyl glycol, ethyl glycol, isopropyl glycol or butyl glycol are used. For the preparation of the electrophoretic baths, the pigments, e.g. titanium dioxide, are dispersed in a binder in the proportion of 1:0.4 in the non-neutralized solution. The neutralization of the pigmented solution is effected with amines among which diisopropanol amine, triethylamine and diethylamine are especially suitable. After the neutralization, the further dilution to the bath concentration, which is usually between 10 and 20 weight percent, is effected with deionized water. It is, however, also possible to disperse the pigments in the already neutralized solutions. An at least partial precondensation between epoxy resin partial esters and relatively low molecular and at least hydrophilic thermosetting condensation products can be effected at temperatures between 80 and 160° C., especially when the coating materials are to be used as binders for electrophoretically depositable coating compositions. The precondensation is performed preferably with phenol resols and phenol carboxylic acid resols. By the use of precondensed combination of epoxy resin esters and phenol resols, a better storage stability for the aqueous solution is obtained.

EXAMPLE 2

600 parts of the epoxy resin partial ester are reacted with 545 parts phenol resol A at 90 to 110° C. until the viscosity with 50% in butyl glycol reaches about G–H (Gardner-Holdt viscosimeter). The acid number of the resin lies between 90 and 95. The condensation can be performed under vacuum while the excess water is distilled off. The resin is diluted to a solids content of about 75% by weight by using glycol ethers such as methyl glycol, ethyl glycol, isopropyl glycol or butyl glycol.

For preparing electrophoretic baths, pigments such as titanium dioxide are dispersed in a binder in the proportion of 1:0.4 in the non-neutralized solution. The neutralization of the pigmented solution is effected with amines, especially with isopropanolamine, triethylamine and diethylamine. After the neutralization, the further dilution to the bath concentration, which lies usually between 10 and 20% by weight, is accomplished with deionized water. It is, however, equally possible to mix the already neutralized solutions with pigments. When the compositions are to be used as binders for electrophoretically depositable coatings, it is advantageous to effect an at least partial precondensation between the epoxy resin partial ester and the relatively low molecular at least hydrophilic thermosetting condensation products between 80 and 160° C. The precondensation is preferably performed with phenol resols and phenol carboxylic acid resols, especially with etherified phenol resols, a longer shelf life of the aqueous solutions is obtained.

Preparation of the phenol resol B 500 parts of p-tert.butyl phenol resol 1 are dissolved in 2000 parts of n-butanol and the water is removed by cyclic distillation.

The solution is then acidified to a pH value of 2 using hydrochloric acid and the cyclic distillation is continued until no water distills over. The mix is neutralized and concentrated in vacuo to a solids content of 90 to 92% by weight and filtered.

Preparation of the phenol resin C 228 g. 2,2-bis(4-hydroxyphenyl)propane is reacted with 500 g. aqueous formaldehyde (30% strength by weight solution) at a pH value of 8 to 9 being adjusted by addition of 40% strength by weight solution of sodium hydroxide. The mix is kept at 80 to 90° C. until the content of free formaldehyde has dropped to about 5% by weight. The resol is then precipitated by addition of diluted sulfuric acid and is washed salt-free with water. The resin is then dissolved in 300 g. n-butanol and the pH value of the solution is adjusted to 5 after removal of water by a short distillation. The etherification is then carried out at 110° C. for 1 hour and excess n-butanol is removed by distillation. The obtained resin is then diluted to a solids content of 75% by weight using ethyleneglycol monoethyl ether.

EXAMPLE 3

250 g. of epoxy resin, being produced from 2,2-bis-(4-hydroxyphenyl)propane and epichlorohydrin and having an epoxy equivalent weight of 870 to 1025 and a molecular weight of 1400, are esterified with 100 g. of linseed oil fatty acid until the acid number has dropped below 5, in the presence of 0.2 g. soda at 240° C. Then 350 g. of preliminary product (a) are added and the esterification is carried out at 130° C. until the viscosity amounts to Q according to Gardner-Holdt, measured 50% strength by weight in ethylene glycolmonobutylether. 330 g. of phenol resol B are then added to the mix and the pre-condensation is carried out at 120° C. for one hour. The resin is then diluted to a solids content of 70% by weight using ethyleneglycolmonoethylether.

EXAMPLE 4

250 g. of epoxy resin, being produced from 2,2-bis-(4-hydroxyphenyl)propane and epichlorohydrin and having an epoxy equivalent weight of 450 to 520 and a molecular weight of 900, are esterified with 150 g. tall oil fatty acid in the presence of 0.2 g. of soda at 230° C. until the acid number has dropped below 5. Then 400 g. of the preliminary product (a) are added and the esterification is carried out at 130° C. until the viscosity has reached Q according to Gardner-Holdt, measured 50% strength by weight in ethyleneglycolmonobutylether. Thereafter 330 g. of phenol resol C are added to the mix and the precondensation is carried out at 100° C. for one hour. The obtained resin is diluted to a solids content of 70% by weight using ethyleneglycolmonoethylether.

EXAMPLE 5

100 g. of epoxy resin, being produced from 2,2-bis(4-hydroxyphenyl)propane and epichlorohydrin and having an epoxy equivalent weight of 1650 to 2050 and a molecular weight of 2900, are mixed with 300 g. of the epoxy resin being described in Example 1 and the mix is reacted with 350 g. of dehydrated castor oil fatty acid in the presence of 0.2 g. soda at 230° C. until the acid number dropped below 1. Then 350 g. of preliminary product (a) are added and the esterification is carried out at 140° C. until the viscosity reaches G according to Gardner-Holdt, measured 50% strength by weight in ethyleneglycolmonobutylether. Thereafter 570 g. of phenol resol C are added and precondensed at 100° C. for one hour.

The resin is diluted to a solids content of 70% by weight using ethyleneglycolmonoethylether.

Comparison tests to prove the advance over the art (1) A precondensate resin is prepared according to Example 1 of the present invention. The resin is diluted to a solids content of 70 percent by weight using ethyleneglycol monoethyl ether.

(2) Another resin is produced as disclosed in Example 1 of the present invention but the epoxy resin partial ester and the phenol resol 1 are merely mixed and not reacted by condensation. The mixture is then also diluted to a solid content of 70 percent by weight.

Both resins are then ball milled with a mixture of equal parts of titanium dioxide and aluminium silicate having then a pigment/binding agent ratio of 0.3:1.

The pigment paste is then neutralized using dimethylene ethanolamine and diluted with deionized water until the solids content amounts to 13 percent by weight.

Degreased steel sheets were coated with a layer thickness of 22 to 25μ using the above described baths in an electrophoretic deposition. The electrophoresis baths were kept at 40° C. while being stirred. After 24 hours, newly degreased steel sheets were coated electrophoretically.

The coatings were not stoved but only dried and then analyzed. Hereby it is shown that the phenol constituent of the mixed resin started to flocculate resin ingredients from the electrophoresis bath containing the resin mixture after having been stored at 40° C. for 40 hours. After a 100 hours storage at 40° C. the electrophoresis bath had been utterly unusable and it was not possible any more to deposit coatings having a resonable appearance. The electrophoresis bath containing the precondensate as binding agent had been unchanged after a storage time of a 100 hours at 40° C., and the deposited films showed satisfactory surfaces.

(3) The precondensation product of Example 3 was pigmented and diluted to a solids content of 70% by weight using ethyleneglycolmonoethylether.

(4) The epoxy resin of Example 3 was produced but instead of the phenol resin 240 g. of hexamethoxymethylmelamine was added and the precondensation was carried out at 100° C. for one hour. The obtained resin was pigmented and diluted to a solids content of 70% by weight using ethyleneglycolmonoethylether.

(5) The epoxy resin of Example 3 was produced but instead of carrying out the described precondensation, the phenol resin was only admixed. The obtained mixture was pigmented and diluted to a solids content of 70% by weight using ethyleneglycolmonoethylether.

From the resin solutions of Comparison Tests 3 to 5 electrophoresis baths were prepared in which zinc phosphated steel sheets were coated electrophoretically. The thickness of the layer obtained after 30 minutes' stoving at 170° C. amounted to 25 to 30μ.

From these baths so many sheets were coated until each first bath charge was completely used up (one turn over). In order to keep a constant solids content of these baths non-neutralized pigment paste was added in small portions during the depositing procedure.

After this first turn over new zinc phosphated steel sheets were coated. These sheets were supplied with a cross-cut after stoving and subjected to the salt spray test (ASTM B–117–64) for 160 hours.

|  | Resin of— | | |
| --- | --- | --- | --- |
|  | Test 3 | Test 4 | Test 5 |
| (1) Turn over | 1-0-1 | 5-2-3 | 1-0-1 |
| (2) Turn over | 1-0-1 | 5-2-3 | 5-3-3 |

The first number gives the damaged region in mm. from the cross-cut.
The second number gives the samaged region in mm. from the edge of the sheets.
The third number gives a grading for the surface: 1 means undamaged; and 5 means completely damaged.

These results show that phenoplast combinations are to be preferred over aminoplast combinations concerning the corrosion resistance. Furthermore the pre-condensates are to be preferred over simple mixtures concerning the corrosion resistance of sheets being coated after the first turn-over.

The most substantial advance of resins being produced according to this invention over resins produced according to the prior art manifests itself in two spots:

(1) The use of phenol resols in combination with epoxy resins and carboxylic acid adducts and (2) The step of pre-condensation.

By Pattison, Tanner and Spalding combinations of epoxy resins and aminoplasts became known. By Hoenel and the Belgian Patent of Glasurit aminoplasts and phenoplasts were considered totally equivalent concerning their reaction products with epoxy resins. In the present invention it had been found that surprisingly combinations with phenol resols have proved superior in view of corrosion resistance of the finished coatings.

By the step of pre-condensation a much improved storability is achieved of the resinous bath solutions and on the other hand a more homogeneous deposition results during the electrophoretic coating process. Hereby a better corrosion resistance is obtained after prolonged deposition procedure.

This also is a surprising aspect of the present invention because according to the existing opinion the reactive spots of the resin are removed by the pre-condensation.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalance of the following claims.

What is claimed is:

1. Water-dilutable heat-curable coating compositions for electrophoretic deposition comprising the following components:

(I) precondensates of hydrophilic plasticizing epoxy resin partial esters with thermosetting aldehyde products formed by heating to temperatures of about 80 to 160° C. in the proportions of about 1 to 50 percent by weight of said thermosetting aldehyde products to said partial esters, said precondensates having a Gardner-Holdt viscosity of about B to Q measured at 50 percent in butyl glycol and an acid number range of 60 to 100, wherein:

(a) said hydrophilic plasticizing epoxy resin partial esters are selected from the group consisting of:

(1) the partial esters of compounds containing epoxy groups or hydroxyl groups produced by hydrolytic cleavage of said epoxy groups with at least one monocarboxylic acid and a polybasic carboxylic acid;

(2) the partial esters of compounds containing epoxy groups or hydroxyl groups produced by hydrolytic cleavage of said epoxy groups with a polybasic carboxylic acid and (3) mixtures of (1) and (2); wherein said polybasic carboxylic acid of (1) and (2) comprises hydrolyzed adducts selected from the group consisting of maleic acid with fatty acids and maleic anhydride with fatty acids, said fatty acids are selected from the group consisting of drying oil acids and semidrying oil acids, the molar proportion of fatty acid to maleic acid or maleic anhydride is between about 0.9:1 and 1.1:1 and the molar proportion of free hydroxyl groups to free carboxyl groups is between about 1:0.8 and 1:1, wherein one epoxy group is calculated as two hydroxyl groups and one anhydride group is calculated as two carboxyl groups, said adducts containing no more than 3 percent of free maleic anhydride; and
(b) said thermosetting aldehyde products are selected from the group consisting of:
(1) phenol resols and
(2) etherified phenol resols;
(II) strong nitrogenous bases forming soaps with the said hydrophilic plasticizing epoxy resin partial esters; and
(III) water.

2. The composition of claim 1, wherein said polybasic carboxylic acid is a reaction product of dehydrated castor oil fatty acid, tall oil fatty acid and maleic anhydride.

3. The composition of claim 1, wherein said phenol resols are thermosetting hydrophilic condensation products of phenols selected from the group consisting of phenol, p-tert. butyl phenol and 2,2-bis (4-hydroxyphenyl) propane with formaldehyde or formaldehyde donating compounds.

4. The composition of claim 1, wherein said etherified phenol resols are etherification products of the phenol resols of claim 3 and methanol or n-butanol.

5. The composition of claim 1, wherein said hydrophilic plasticizing epoxy resin partial esters are reaction products of the polycarboxylic acid of claim 2 and an epoxy resin based on bisphenol A and epichlorohydrin and having an epoxy equivalent weight of 230 to 280 and a molecular weight of about 470.

6. The composition of claim 1 wherein the polycarboxylic acids contain up to 50% by weight of rosin acids.

References Cited

UNITED STATES PATENTS

| | | | |
|---|---|---|---|
| 3,450,660 | 6/1969 | Sekmakas | 260—29.4 |
| 3,444,114 | 5/1969 | Downing | 260—21 |
| 3,133,032 | 5/1964 | Jen | 260—29.4 |
| 2,915,486 | 12/1959 | Shelly | 260—21 |
| 3,409,581 | 11/1968 | Hagan | 260—831 |
| 3,355,401 | 11/1967 | Tanner | 260—18 |
| 3,308,077 | 3/1967 | Pattison | 260—18 X |
| 3,305,501 | 2/1967 | Spalding | 260—18 |
| 3,196,117 | 7/1963 | Boller | 260—18 X |
| 2,681,894 | 6/1954 | Hoenel | 260—29.3 |
| 2,649,433 | 8/1953 | Hoenel | 260—842 |
| 3,661,818 | 5/1972 | Güldenpfennig | 260—19 EP |
| 3,650,996 | 3/1972 | Güldenpfennig | 260—19 EP |
| 3,567,668 | 3/1971 | Güldenpfennig | 260—29.3 |
| 3,563,926 | 2/1971 | Lackner | 260—29.3 |
| 3,502,557 | 3/1970 | Yurcheshen | 260—29.4 |
| 3,549,577 | 12/1970 | Stromberg | 260—29.4 |
| 3,242,119 | 3/1966 | Ott | 260—29.4 |

FOREIGN PATENTS

| | | | |
|---|---|---|---|
| 633,074 | 10/1963 | Belgium | 204—181 |

DONALD E. CZAJA, Primary Examiner

C. W. IVY, Assistant Examiner

U.S. Cl. X.R.

204—181; 260—29.3, 831